United States Patent
Na et al.

(10) Patent No.: US 7,825,856 B2
(45) Date of Patent: Nov. 2, 2010

(54) LOW COMPLEXITY BLIND BEAMFORMING WEIGHT ESTIMATION

(75) Inventors: Yanxin Na, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/184,319

(22) Filed: Aug. 1, 2008

(65) Prior Publication Data

US 2009/0051594 A1  Feb. 26, 2009

Related U.S. Application Data (60) Provisional application No. 60/957,115, filed on Aug. 21, 2007.

(51) Int. Cl.
*H01Q 3/00* (2006.01)

(52) U.S. Cl. ........................ 342/373; 342/377

(58) Field of Classification Search ................ 342/368, 342/372, 373, 378, 383, 377
See application file for complete search history.

(56) References Cited

U.S. PATENT DOCUMENTS

2004/0146024 A1  7/2004  Li et al.

2005/0157776 A1 * 7/2005 Ryu ........................... 375/148
2009/0004988 A1 * 1/2009 Jin et al. ...................... 455/272
2009/0015472 A1 * 1/2009 Lozano ....................... 342/367

FOREIGN PATENT DOCUMENTS

WO    2007136434 A1   11/2007

OTHER PUBLICATIONS

Choi, Jinho, "Beamforming for the Multiuser Detection with Decorrelator in Synchronus CDMA Systems: Approaches and Performance Analysis," Signal Processing, Elsevier Science Publishers B.V. Amterdam, NL, vol. 60, No. 2, Jul. 1, 1997, pp. 195-211.
International Search Report and Written Opinion dated Mar. 27, 2009 cited in PCT/US2008/072767.

* cited by examiner

*Primary Examiner*—Dao L Phan (57) ABSTRACT

Techniques are provided to compute beamforming weights at a communication device, e.g., a first communication device, based on transmissions received at a plurality of antennas from another communication device, e.g., a second communication device. A plurality of transmissions are received at the plurality of antennas of the first communication device from the second communication device. A covariance matrix associated with reception of a plurality of transmissions at the plurality of antennas of the first communication device is computed. Corresponding elements (e.g., all the rows or all the columns) of the covariance matrix are combined to produce a weighted channel signature vector. A receive beamforming weight vector is computed from the weighted channel signature vector.

27 Claims, 7 Drawing Sheets

FIG.8

LOW COMPLEXITY BLIND BEAMFORMING WEIGHT ESTIMATION

CROSS-REFERENCE TO RELATED APPLICATIONS

This application claims priority to U.S. Provisional Patent Application No. 60/957,115, filed Aug. 21, 2007, the entirety of which is incorporated herein by reference.

BACKGROUND

In wireless communication systems, antenna arrays are used at devices on one or both ends of a communication link to suppress multipath fading and interference and to increase system capacity by supporting multiple co-channel users and/or higher data rate transmission. However, in order to achieve these gains, the antenna elements in an antenna array are weighted with corresponding elements of a vector, called a beamforming weight vector or a spatial signature.

There are challenges in computing the proper beamforming weight vector. For example, the estimation of the beamforming weight vector can be computationally intensive. Consequently, as the number of antenna elements at one or both devices on a communication link is increased, computing the beamforming weight vector becomes even more intensive. In addition, in some system implementations, pilot or preamble signals are used to allow a device on the link to estimate channel conditions. The use of pilot or preamble signals introduces overhead in the system and therefore reduces overall system data capacity.

DESCRIPTION OF EXAMPLE EMBODIMENTS

Overview

Techniques are provided to compute beamforming weights at a communication device, e.g., a first communication device, based on transmissions received at a plurality of antennas from another communication device, e.g., a second communication device. A plurality of transmissions are received at the plurality of antennas of the first communication device from the second communication device. A covariance matrix associated with reception of a plurality of transmissions at the plurality of antennas of the first communication device is computed. Corresponding elements (e.g., all the rows or all the columns) of the covariance matrix are combined to produce a weighted channel signature vector. A receive beamforming weight vector is computed from the weighted channel signature vector. The receive beamforming weight vector may be applied to signals associated with a transmission received at the plurality of antennas of the first device for receive signal detection. In addition, the receive beamforming weight vector may be used to derive a transmit weight vector (transmit beamforming weights) for application to one or more signal streams to be transmitted via the plurality of antennas of the first communication device to a plurality of antennas of the second communication device.

Figure 1:
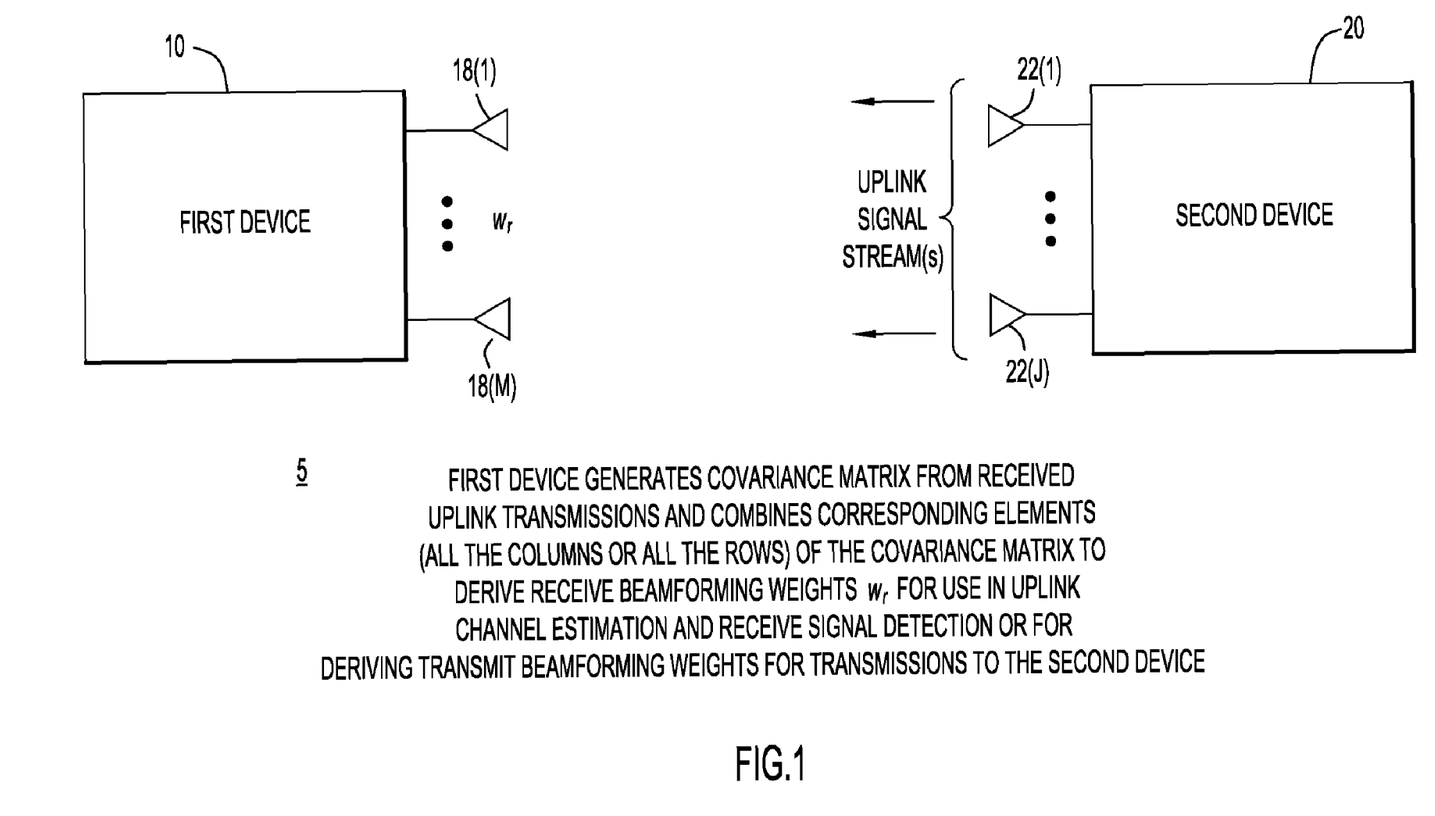
FIG. 1 is a block diagram showing an example of a wireless communication system in which a first communication device derives beamforming weights using a low complexity blind beamforming generation process.

Referring first to FIG. 1, a wireless radio communication system or network is shown generally at reference numeral 5 and comprises a first communication device 10, e.g., a base station (BS), and a second communication device 20, e.g., a mobile station (MS). The BS 10 may connect to other wired data network facilities (not shown) and in that sense serves as a gateway or access point through which one or more MS's have access to those data network facilities.

The BS 10 comprises a plurality of antennas 18(1)-18(M) and the MS 20 comprises a plurality of antennas 22(1)-22(J). The BS 10 may wirelessly communicate with the MS 20 using a wideband wireless communication protocol in which the bandwidth is much larger than the coherent frequency bandwidth. An example of such a wireless communication protocol is the IEEE 802.16 communication standard, also known commercially as WiMAX™. Another example of a wireless communication protocols is the IEEE 802.11 communication standard, also know commercially as WiFi™.

Either or both of the BS 10 and the MS 20 are is configured to perform a low complexity blind beamforming generation process described herein. The process is referred as a "blind" estimation technique because it assumes that a first device has no a priori knowledge of the data signals contained in transmissions that are received from a second device, and from which the first device computes a receive beamforming weight vector to be applied. The process involves generating a covariance matrix from transmissions that one device receives from the other device. By assuming that the individual spatial vectors within the covariance matrix are closely correlated, corresponding elements (all of the columns or all of the rows) of the covariance matrix are combined to obtain a vector referred to herein as a weighted channel signature vector. The receive beamforming weight vector is then computed from the weighted channel signature vector. The receive beamforming weight vector may be used to estimate the channel and for application to the receive signals, or for deriving a transmit beamforming weight vector. This method reduces the complexity of the beamforming weight computations by avoiding computationally-intense computations such as a singular value decomposition (SVD) of the covariance matrix. Since the covariance matrix is a set of self-correlated elements, the weight vector or spatial signature can be extracted without a priori knowledge of the received transmissions.

Figure 2:
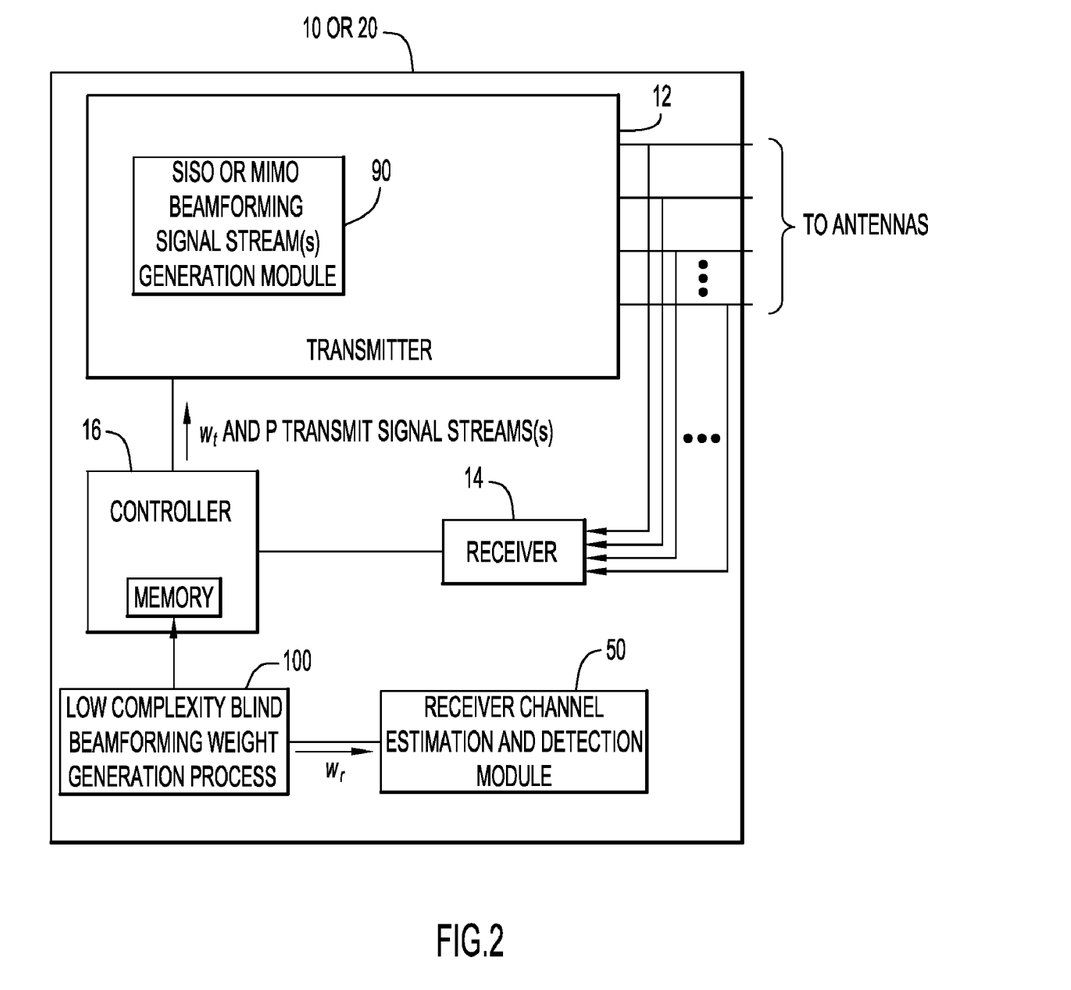
FIG. 2 is a block diagram showing an example of a communication device that is configured to compute beamforming weights using the low complexity blind beamforming generation process.

Turning to FIG. 2, an example of a block diagram is shown of a wireless communication device, e.g., BS 10 and/or MS 20, that is configured to perform the techniques described herein. The device comprises a transmitter 12, a receiver 14 and a controller 16. The controller 16 supplies data to the transmitter 12 to be transmitted and processes signals received by the receiver 14. In addition, the controller 16 performs other transmit and receive control functionality. Part of the functions of the transmitter 12 and receiver 14 may be implemented in a modem and other parts of the transmitter 12 and receiver 14 may be implemented in radio transmitter and radio transceiver circuits. It should be understood that there are analog-to-digital converters (ADCs) and digital-to-analog converters (DACs) in the various signal paths to convert between analog and digital signals.

The receiver 14 receives the signals detected by each of the antennas and supplies corresponding antenna-specific receive signals to controller 16. It is understood that the receiver 14 may comprise a plurality of receiver circuits, each for a corresponding one of a plurality of antennas. For simplicity, these individual receiver circuits and individual transmitter circuits are not shown.

The controller 16 comprises a memory 17 or other data storage block that stores data used for the techniques described herein. The memory 17 may be separate or part of the controller 16. Instructions for performing a low complexity blind beamforming weight generation process 100 may be stored in the memory 17 for execution by the controller 16. The process 100 generates the receive beamforming weight vector $w_r$ that is supplied to a receiver channel estimation and detection module 50. The receiver channel estimation and detection module 50 uses the beamforming weight vector $w_r$ for receiver channel estimation by applying it to antenna-specific signals detected by the antennas (antennas 18(1)-18(M)) of the BS 10 or antennas 20(1) to 20(J) of the MS 20) thereby improving receiver performance.

The transmitter 12 may comprise individual transmitter circuits that supply respective upconverted signals to corresponding ones of a plurality of antennas (antennas 18(1)-18(M)) of the BS 10 or antennas 20(1) to 20(J) of the MS 20) for transmission. To this end, the transmitter 12 comprises a single-input single-output (SISO) or multiple-input multiple-output (MIMO) beamforming signal stream generation module 90 that computes a transmit beamforming weight vector $w_t$ comprising P beamforming weights from the receive beamforming weights $w_r$ computed by the process 100, where P is an integer greater than or equal to 1. The module 90 may apply the transmit weight vector $w_t$ to P signal streams to be transmitted via respective antennas.

The functions of the controller 16 may be implemented by logic encoded in one or more tangible media (e.g., embedded logic such as an application specific integrated circuit, digital signal processor instructions, software that is executed by a processor, etc.), wherein the memory 17 stores data used for the computations described herein (and/or to store software or processor instructions that are executed to carry out the computations described herein). Thus, the process 100 may be implemented with fixed logic or programmable logic (e.g., software/computer instructions executed by a processor). Moreover, the functions of the receiver channel estimation and detection module 50, the beamforming signal stream generation module 90 and the process 100 may be performed by the same logic component, e.g., the controller 16.

Figure 3:
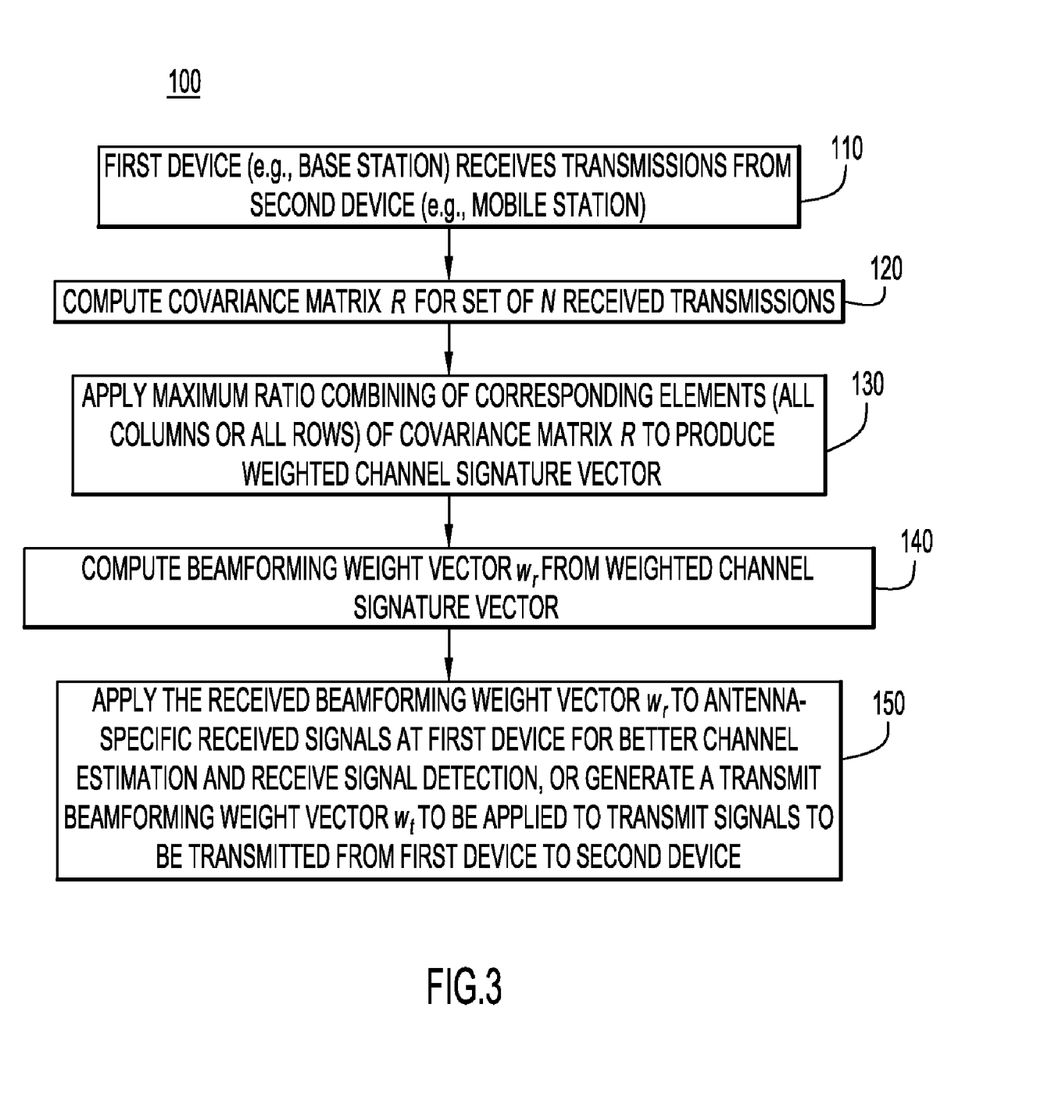
FIG. 3 is a flow chart that generally depicts the low complexity blind beamforming generation process.

The low complexity blind beamforming generation process 100 is now generally described with reference to FIG. 3. At 110, the first device, e.g., BS 10, receives transmissions from the second device, e.g., MS 20. In the foregoing description, an example of a wireless communication system is considered in which the first device has M antennas for transmission and reception and the second device has J antennas for transmission. The term "coherence time interval" as used herein refers to a time interval within which the phase and magnitude of a communication channel are, on average, predictable, or highly correlated. Signals in any interval shorter than the coherence time interval can be averaged when considering communication channel conditions. Similarly, the term "coherence frequency band" as used herein refers to a frequency range in which the phase and magnitude of a communication are, on average, predictable or highly correlated. Signals in any frequency range smaller than the coherence frequency band can be averaged when considering communication channel conditions.

At 110, transmissions that are received during a time interval that is shorter than the coherence time interval and within a frequency range that is less than the coherence frequency band are considered for purposes of the techniques described herein. A set N received transmissions (over time) $y_n$ for n=1,2, . . . , N are derived for transmissions comprising information (data or pilots) $s_n$ for n=1,2, . . . , N. The channel (spatial) information may be denoted $h_{m,n}$ for n=1,2, . . . , N transmissions, and m=1,2, . . . , M antennas at the first device, e.g., BS 10, and likewise additive Gaussian white noise may be denoted $e_{m,n}$. Using this notation, a received signal matrix Y is computed as $$Y = [y_1 \ldots y_n \ldots y_N]$$

$$= \begin{bmatrix} h_{1,1}s_1 + e_{1,1} & \ldots & h_{1,n}s_n + e_{1,n} & \ldots & h_{1,N}s_N + e_{1,N} \\ \vdots & \ddots & \ddots & \ddots & \vdots \\ h_{m,1}s_1 + e_{m,1} & \ldots & h_{m,n}s_n + e_{m,n} & \ldots & h_{m,N}s_N + e_{m,N} \\ \vdots & \ddots & \ddots & \ddots & \vdots \\ h_{M,1}s_1 + e_{M,1} & \ldots & h_{M,n}s_n + e_{M,n} & \ldots & h_{M,N}s_N + e_{M,N} \end{bmatrix}$$

At 120, a covariance matrix R is computed for the set of N received transmissions. Again, it is assumed that the N received transmissions are within the coherence time interval and/or coherence frequency band for the communication system environment under consideration. The covariance matrix R of the received transmissions is computed from the receive signal matrix Y as:

$$R = YY^H$$

$$= \sum_{n=1}^{N} y_n y_n^H$$

-continued $$= \begin{bmatrix} \sum_{n=1}^{N} (h_{1,n}s_n + e_{1,n})(h_{1,n}s_n + e_{1,n})^H & \cdots & \sum_{n=1}^{N} (h_{1,n}s_n + e_{1,n})(h_{m,n}s_n + e_{m,n})^H & \cdots & \sum_{n=1}^{N} (h_{1,n}s_n + e_{1,n})(h_{M,n}s_n + e_{M,n})^H \\ \vdots & \ddots & \vdots & \ddots & \vdots \\ \sum_{n=1}^{N} (h_{m,n}s_n + e_{m,n})(h_{1,n}s_n + e_{1,n})^H & \ddots & \sum_{n=1}^{N} (h_{m,n}s_n + e_{m,n})(h_{m,n}s_n + e_{m,n})^H & \ddots & \sum_{n=1}^{N} (h_{m,n}s_n + e_{m,n})(h_{M,n}s_n + e_{M,n})^H \\ \vdots & \ddots & \vdots & \ddots & \vdots \\ \sum_{n=1}^{N} (h_{M,n}s_n + e_{M,n})(h_{1,n}s_n + e_{1,n})^H & \cdots & \sum_{n=1}^{N} (h_{M,n}s_n + e_{M,n})(h_{m,n}s_n + e_{m,n})^H & \cdots & \sum_{n=1}^{N} (h_{M,n}s_n + e_{M,n})(h_{M,n}s_n + e_{M,n})^H \end{bmatrix}$$

where H stands for the Hermitian transpose operation.

A typical method of estimating the beamforming weights at this stage is to compute the SVD of the covariance matrix R. However, rather than performing this computationally-complex operation, corresponding elements (either all of the columns or all of the rows) of the covariance matrix R are combined to produce a weighted channel signature vector. For example, the corresponding elements are combined using a maximal ratio combining technique. The columns of the covariance matrix R are denoted R(:,m) and the rows of the covariance matrix R are denoted R(m,:). Thus, at 130, the weighted channel signature vector derived from the columns of the covariance matrix R is denoted $\hat{H}$ and is computed (in the example where M=8) as:

$$\hat{H} = R(:,1) + e^{j\Theta_2}R(:,2) + e^{j\Theta_3}R(:,3) + e^{j\Theta_4}R(:,4) + e^{j\Theta_5}R(:,5) + e^{j\Theta_6}R(:,6) + e^{j\Theta_7}R(:,7) + e^{j\Theta_8}R(:,8)$$

where $e^{j\Theta_m} = \{R(:,m)\}^{H*} R(:,1)/\text{abs}(\{R(:,m)\}^{H*}R(:,1))$ for $2 \leq m \leq M$.

The weighted channel signature vector derived from the rows of the covariance matrix R is denoted $\tilde{H}$ and (in the example where M=8) is computed as:

$$\tilde{H} = \{R(1,:) + e^{j\Phi_2}R(2,:) + e^{j\Phi_3}R(3,:) + e^{j\Phi_4}R(4,:) + e^{j\Phi_5}R(5,:) + e^{j\Phi_6}R(6,:) + e^{j\Phi_7}R(7,:) + e^{j\Phi_8}R(8,:)\}^H$$

where $e^{j\Phi_m} = R(1,:)*\{R(m,:)\}^H/\text{abs}(R(1,:)*\{R(m,:)\}^H)$ for $2 \leq m \leq M$.

Next, at 140, the receive beamforming weight vector $w_r$ is computed from the weighted channel signature vector $\hat{H}$ or $\tilde{H}$. For example, the receive beamforming weight vector $w_r$ may be computed by first computed the norm of the weighted channel signature vector $\hat{H}$ or $\tilde{H}$, and then divided the weighted channel signature vector $\hat{H}$ or $\tilde{H}$ by the norm, i.e., $w_r = \hat{H}/\text{norm}(\hat{H})$ or $w_r = \tilde{H}/\text{norm}(\tilde{H})$.

Then, at 150, the receive beamforming weight vector $w_r$ can be applied to the antenna-specific receive signals at the first device to achieve better channel estimation and receiver performance. A transmit beamforming weight vector $w_t$ may be derived from the receive beamforming weight vector $w_r$ to beamformed transmit signals from the first device to the second device.

The larger the number N of transmissions considered for the computation of the covariance matrix R, the better the estimate that can be obtained provided the collected the sets of received transmissions are in the coherence time interval or coherent frequency band. The transmissions from which the beamforming weights are computed can be in different frequency channels, different time slots, different codes or any combination of thereof.

Figure 4:
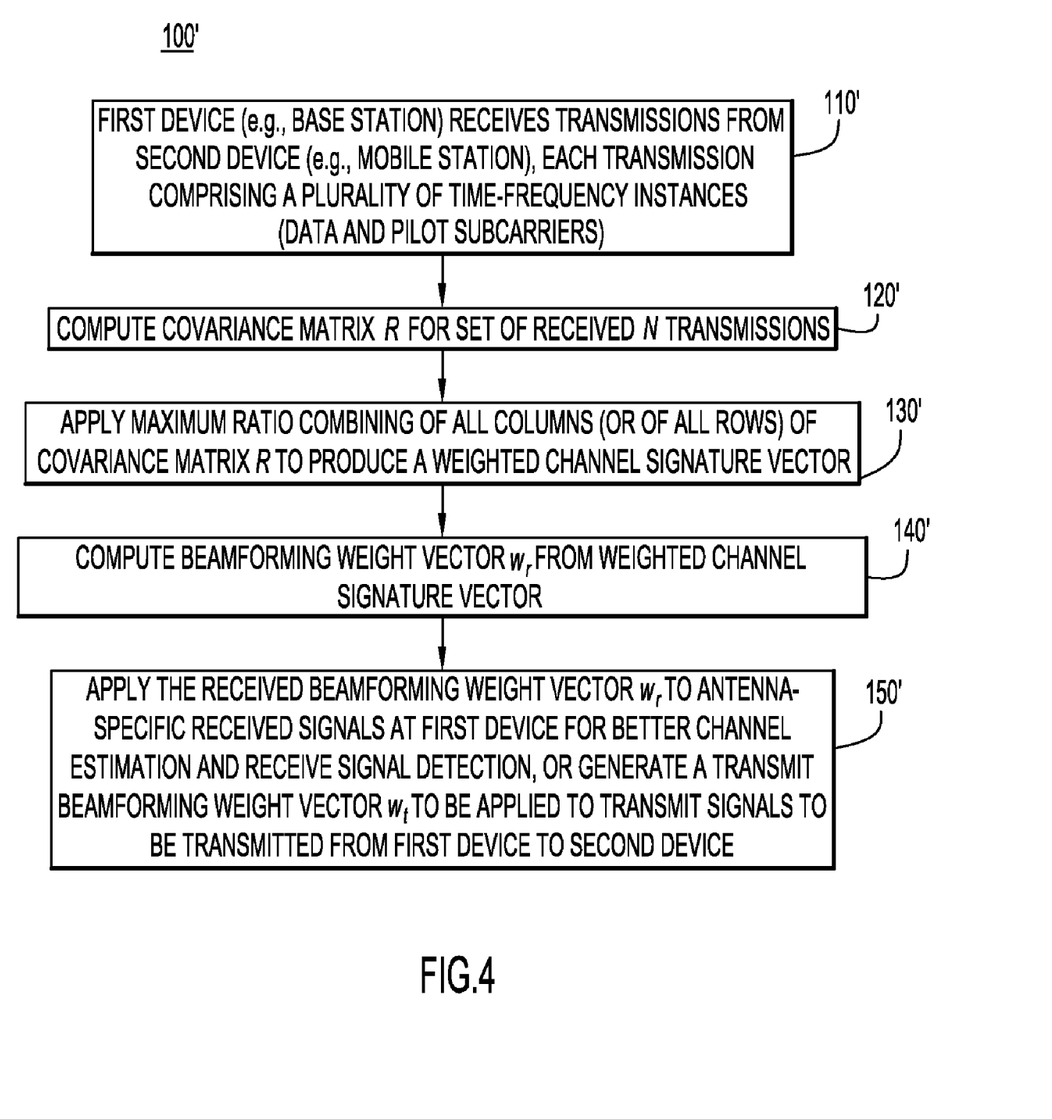
FIG. 4 is a flow chart that depicts the low complexity blind beamforming generation process according to an example embodiment.
Figure 5:
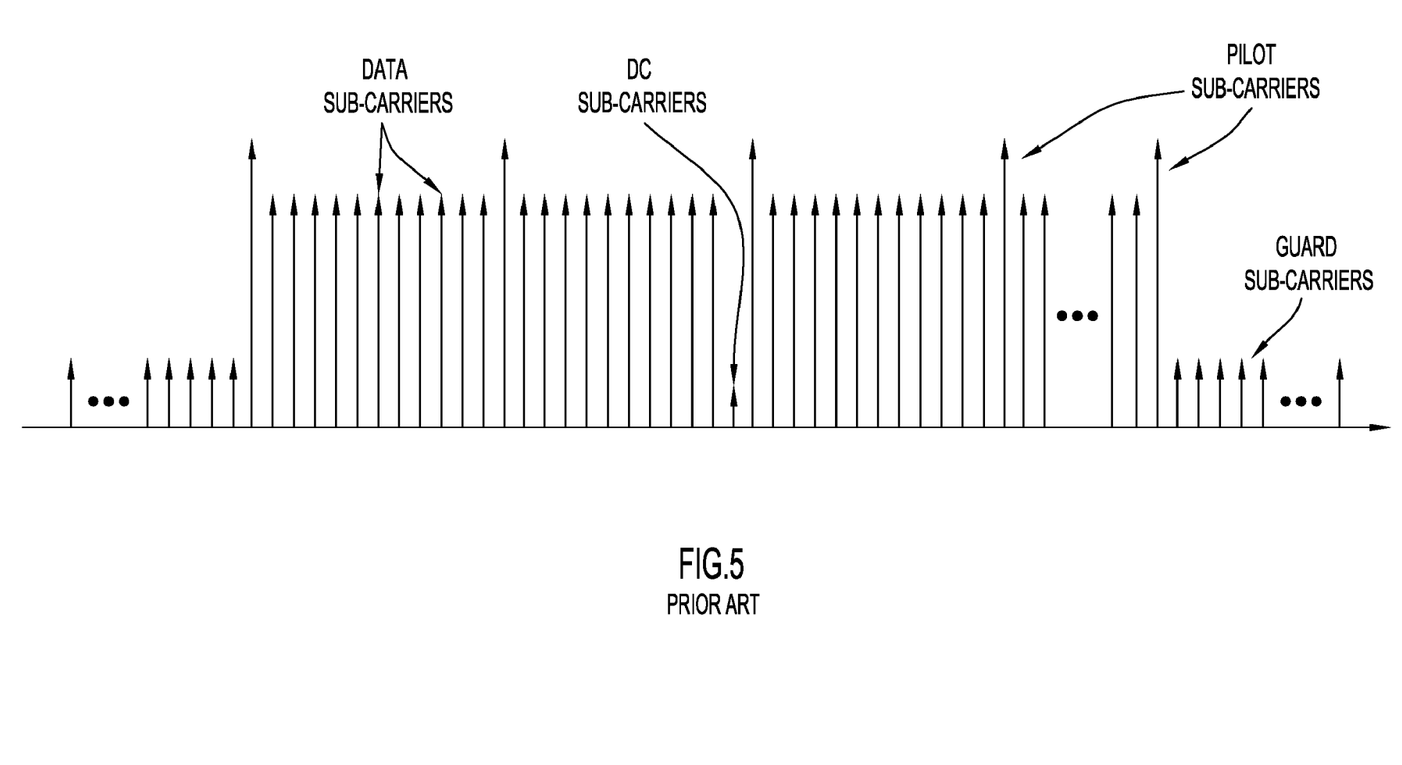
FIG. 5 is a signal timing diagram illustrating an example of a communication signal format with which the low complexity blind beamforming generation process may be employed.

One embodiment of this invention is to use this technique in the case of orthogonal frequency division modulation (OFDM). In this case, each transmission is a symbol, and each symbol comprises a plurality of data subcarriers and a plurality of pilot subcarriers. Consequently, each element of the received signal matrix Y is expanded to account for each of the subcarriers in a symbol, and this carries through to the covariance matrix R. FIG. 4 illustrates an embodiment of process 100, shown at 100', where each transmission comprises a plurality of time-frequency instances (e.g., pilot and data subcarriers). FIG. 5 illustrates an example of a symbol that comprises a plurality of data subcarriers and a plurality of pilot subcarriers. Each of the subcarriers is treated as an individual signal and is accordingly reflected in the elements of the received signal matrix Y, covariance matrix R, weighted channel signal vector $\hat{H}$ or $\tilde{H}$ and ultimately the receive beamforming weight vector $w_r$.

Figures 6, 7:
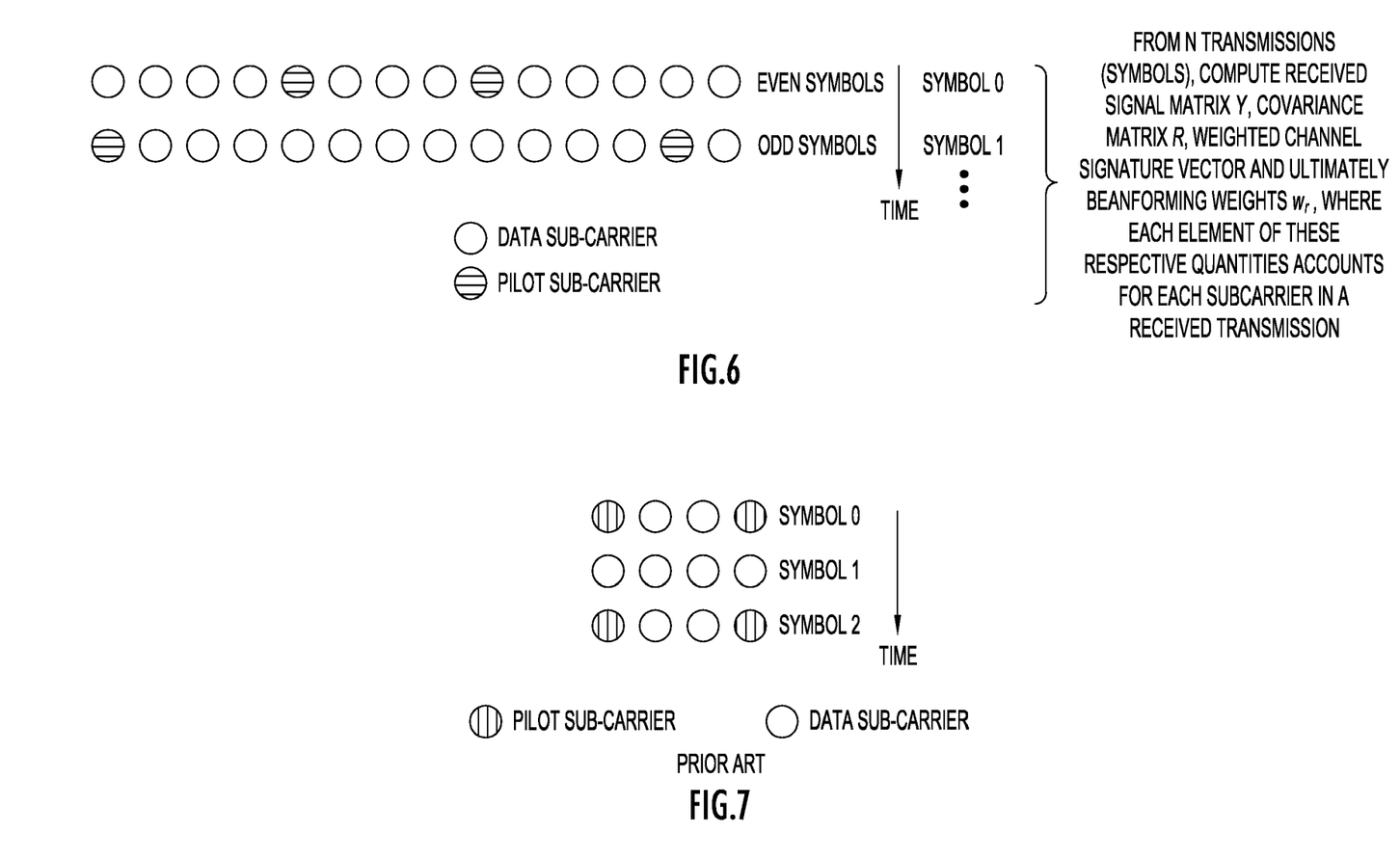
FIGS. 6 and 7 are diagrams illustrating further examples of a communication signal format with which the low complexity blind beamforming generation process may be employed.

At 110', the first device receives a plurality of transmissions, e.g., symbols, from the second device. FIG. 6 illustrates an example of N symbols transmitted by the second device and received at the first device, where each symbol comprises pilot subcarriers and data subcarriers.

At 120', the first device computes the covariance matrix R from the received signal matrix Y associated with reception of N symbols (FIG. 6), which in this case has corresponding values for each of the subcarriers in a symbol at each of the plurality of antennas of the first device. Next, at 130', a weighted channel signature vector $\hat{H}$ or $\tilde{H}$ is computed by maximal ratio combining all rows or all columns of the covariance matrix R. Again, in this case, the computation of the weighted channel signature vector $\hat{H}$ or $\tilde{H}$ accounts for the values of the covariance matrix R at each of the subcarriers such that each element the weighted channel signature vector $\hat{H}$ or $\tilde{H}$ has values for each of the subcarriers. Next, at 140', the receive beamforming weight vector $w_r$ is computed from the weighted channel signature vector $\hat{H}$ or $\tilde{H}$, and each element of the beamforming weight vector $w_r$ has beamforming weight values at each of the subcarriers. Finally, at 150', the receive beamforming weight vector $w_r$ is applied to the antenna-specific receive signals at the first device to achieve better channel estimation and receiver performance. A transmit beamforming weight vector $w_t$ may be derived from the receive beamforming weight vector $w_r$ to beamforming transmit signals from the first device to the second device.

There are schemes that have been developed to permute the subcarrier allocation to achieve frequency diversity and inter-cell interference averaging. One such technique is known as a partially used subcarrier (PUSC) and the PUSC feature can be applied differently on a downlink (DL) (from the first device to the second device) than on an uplink (UL) (from the second device to the first device). One form of PUSC that is used in the DL in a WiMAX system is to group the available or usable subcarriers for each pair of symbols into clusters containing 14 contiguous subcarriers per symbol period, with pilot subcarrier and data subcarrier allocations in each cluster in the even and odd symbols being configured as shown in FIG. 6.

A rearranging scheme is used to form groups of clusters such that each group is made up of clusters that are distributed throughout the subcarrier space. A subchannel in a group contains two clusters and is made up of 48 data subcarriers and eight pilot subcarriers. The data subcarriers in each group are further permuted to generate subchannels within the group, and are distributed to multiple subchannels.

By contrast, the UL PUSC mode of a WiMAX system employs a tile structure shown at FIG. 7. The available subcarrier space is split into tiles. Six tiles chosen from across the entire spectrum (through a rearranging/permutation scheme) are grouped together to form a slot. The slot comprises 48 data sub-carriers and 24 pilot sub-carriers in 3 symbols. For each tile, all 12 received pilot and data subcarriers are used to calculate one beamforming weight vector $w_r$. The receive beamforming weight vector $w_r$ is then applied to the received signal for the tile to generate the beamformed received signal as described above at 150 or 150' in connection with FIGS. 3 and 4.

There is another feature known as adaptive modulation and coding (AMC) that is employed in wireless communication systems, such as WiMAX, on both the UL and DL. The contiguous permutations include DL AMC and UL AMC, which are formatted in the same manner. The contiguous permutation groups a block of contiguous subcarriers to form a subchannel. A bin consists of 9 contiguous subcarriers in a symbol, with 8 assigned for data and one assigned for a pilot. A slot in the AMC mode is defined as a collection of bins of the type (N×M=6), where N is the number of contiguous bins and M is the number of contiguous symbols. Thus, the allowed combinations are [(6 bins, 1 symbol), (3 bins, 2 symbols), (2 bins, 3 symbols), (1 bin, 6 symbols)]. The AMC mode permutation enables multi-user diversity by choosing the subchannel with the best frequency response. For each AMC subchannel or multiple adjacent AMC subchannels, in the coherence time interval or coherence frequency band, the multiple received pilot and data subcarriers in one or multiple AMC subchannels or slots or both are used to estimate the receive beamforming weight vector, then the estimated receive beamforming weight vector is applied to all the AMC subchannels or slots to generate the beamformed received signals thereby obtaining better channel estimation and receiver performance.

The techniques described herein may be employed with one or more multiple access schemes. For example, in a system using time division multiple access (TDMA), code division multiple access (CDMA) on top of OFDM or orthogonal frequency division multiple access (OFDMA), the symbols that form the received signals matrix can be obtained from a combination of the output of the CDMA channels and OFDM (or OFDMA) channels, as well as the symbols from different time periods.

Figure 8:
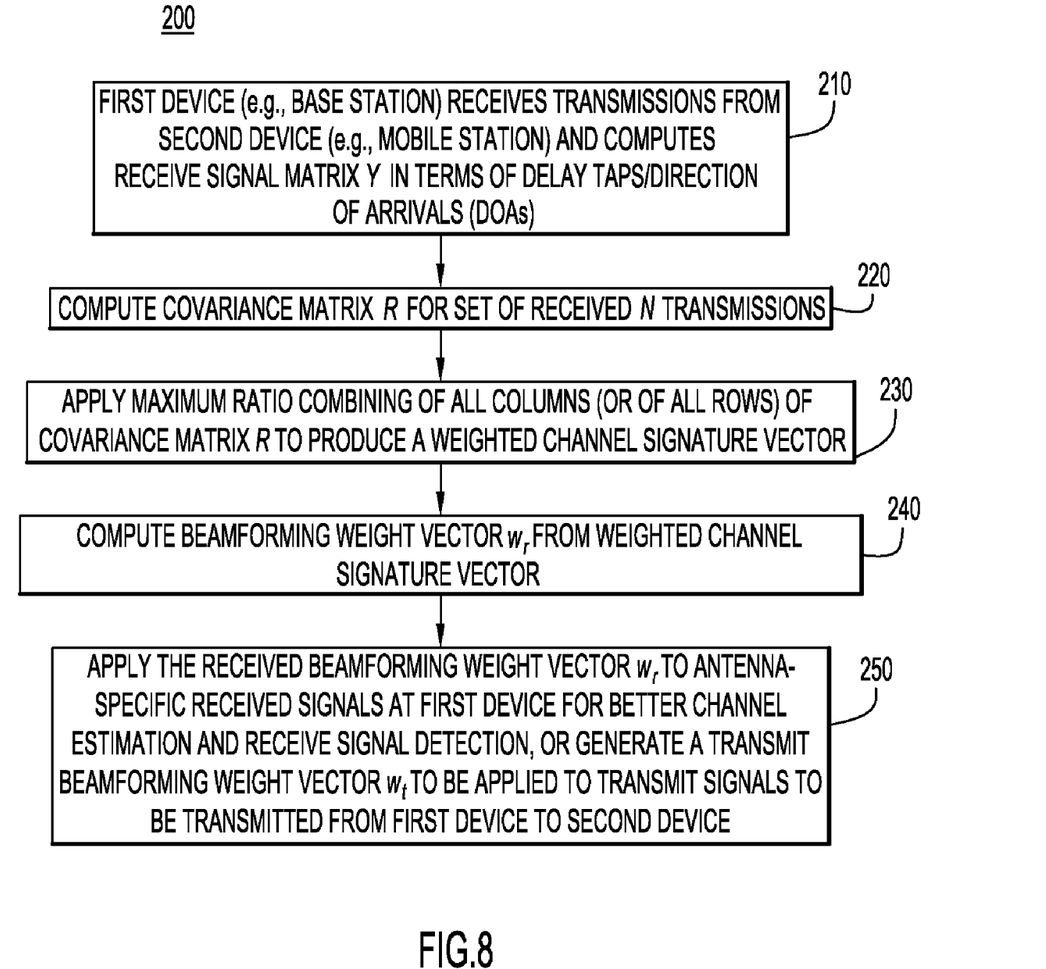
FIG. 8 is a flow chart illustrating another example embodiment of the low complexity blind beamforming generation process.

The techniques are also not limited to the use for only or spatial signature estimates. For example, the channel conditions may be estimated in terms of delay taps for a time-domain based representation of the channel. FIG. 8 illustrates process 200 which is a variation of the process 100 but adapted to model the channel conditions in terms of delay taps. At 210, the first device receives transmissions from the second device and computes a received signal matrix Y in terms of delay taps or direction of arrivals (DOAs) and at 220 the first device computes a covariance matrix R from the received signal matrix Y for a set of N transmissions. Using the same assumption that the channel estimates are closely correlated, at 230, all rows or all columns of the covariance matrix R are combined to compute the weighted channel signature vector. The receive beamforming weight vector $w_r$ is then computed at 240 from the weighted channel signature vector. At 250, the beamforming weight vector $w_r$ is applied to the antenna-specific receive signals at the first device to achieve better channel estimation and receiver performance. A transmit beamforming weight vector $w_t$ may be derived from the receive beamforming weight vector $w_r$ to beamforming transmit signals from the first device to the second device.

The techniques described herein lower the complexity of the computations and consequently can reduce the system hardware cost. In addition, the capacity of the system is increased by eliminating the overhead of pilots and preambles symbols, and makes it possible to increase the number of channel estimates that are performed and at a higher rate. This in turn allows more simultaneous users to be assigned in a given frame and also improves the mobility performance since the coherence time requirement of a spatial signature can be satisfied.

In the various examples described herein, the first device, e.g., the BS 10 in FIG. 1, computes beamforming weights using the low complexity blind beamforming weight generation process based on transmissions received from a second device, e.g., the MS 20 in FIG. 1. It should be understood that the second device may also be configured to execute the low complexity blind beamforming weight generation process based on transmissions received from the first device.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   at a plurality of antennas of a first device, receiving transmissions from a second device;
   computing a covariance matrix associated with reception of a plurality of transmissions at the plurality of antennas of the first device;
   combining either row vectors comprised of respective row elements of the covariance matrix or column vectors comprised of respective column elements of the covariance matrix to produce a weighted channel signature vector; and
   computing a receive beamforming weight vector from the weighted channel signature vector.

2. The method of claim 1, and further comprising applying the receive beamforming weight vector to signals associated with a transmission received at the plurality of antennas of the first device.

3. The method of claim 2, and further comprising computing a transmit beamforming weight vector from the receive beamforming weight vector, and applying the transmit beamforming weight vector to a transmission to be sent via the plurality of antennas of the first device to the second device.

4. The method of claim 1, wherein receiving comprises receiving the transmissions which are within a coherency time interval, and wherein combining comprises combining column vectors or row vectors of the covariance matrix for the coherency time interval.

5. The method of claim 1, wherein combining comprises combining column vectors or row vectors of the covariance matrix for transmissions received within a coherency time interval or within a coherency frequency band to produce the weighted channel signature vector.

6. The method of claim 5, wherein receiving comprises receiving transmissions which comprise a plurality of subcarriers comprising pilot subcarriers and data subcarriers containing data signals, wherein the first device has no a priori knowledge of the data signals contained in transmissions that are received from the second device, and wherein computing the receive beamforming weight vectors comprises computing beamforming weight values at each of the subcarriers.

7. The method of claim 6, wherein computing the receive beamforming weight vector comprises computing one beamforming weight vector with respect to a plurality of pilot subcarriers and data subcarriers.

8. The method of claim 1, wherein combining comprises maximal ratio combining the column vectors of the covariance matrix.

9. The method of claim 1, wherein combining comprises maximal ratio combining the row vectors of the covariance matrix.

10. The method of claim 1, wherein computing the receive beamforming weight vector comprises computing a norm of the weighted channel signature vector and dividing the weighted channel signature vector by the norm.

11. The method of claim 1, and further comprising computing a received signal matrix from the plurality of transmissions received at the plurality of antennas of the first device, and wherein computing the covariance matrix is based on the received signal matrix.

12. An apparatus comprising:
a plurality of antennas;
a receiver that is configured to process transmissions received from another apparatus;
a controller coupled to the receiver, wherein the controller is configured to:
compute a covariance matrix associated with reception of a plurality of transmissions at the plurality of antennas;
combine either row vectors comprised of respective row elements of the covariance matrix or column vectors comprised of respective column elements of the covariance matrix to produce a weighted channel signature vector;
compute a receive beamforming weight vector from the weighted channel signature vector.

13. The apparatus of claim 12, wherein the controller is configured to combine by maximal ratio combining the column vectors of the covariance matrix.

14. The apparatus of claim 12, wherein the controller is configured to combine by maximal ratio combining the row vectors of the covariance matrix.

15. The apparatus of claim 12, wherein the controller is configured to compute the receive beamforming weight vector by computing a norm of the weighted channel signature vector and dividing the weighted channel signature vector by the norm.

16. The apparatus of claim 12, wherein the controller is configured to combine column vectors or row vectors of the covariance matrix for transmissions received within a coherency time interval or within a coherency frequency band.

17. The apparatus of claim 12, wherein the controller is configured to compute elements of the covariance matrix at each of a plurality of subcarriers associated with each of the received transmissions, wherein one or more received transmission comprises pilot subcarriers and data subcarriers containing data signals that are not known a priori at the apparatus.

18. The apparatus of claim 12, wherein the controller is further configured to apply the receive beamforming weight vector to signals associated with a transmission received at the plurality of antennas.

19. The apparatus of claim 12, wherein the controller is further configured to compute a received signal matrix from the plurality of transmissions received at the plurality of antennas, and to compute the covariance matrix based on the received signal matrix.

20. A processor readable memory medium encoded with instructions that, when executed by a processor, cause the processor to:
compute a covariance matrix associated with reception of a plurality of transmissions at a plurality of antennas of a communication device;
combine either row vectors comprised of respective row elements of the covariance matrix or column vectors comprised of respective column elements of the covariance matrix to produce a weighted channel signature vector; and
compute a beamforming weight vector from the weighted channel signature vector.

21. The processor readable medium of claim 20, wherein the instructions that cause the processor to combine comprise instructions that cause the processor to maximal ratio combine the column vectors of the covariance matrix.

22. The processor readable medium of claim 20, wherein the instructions that cause the processor to combine comprise instructions that cause the processor to maximal ratio combine the row vectors of the covariance matrix.

23. The processor readable medium of claim 20, wherein the instructions that cause the processor to compute comprise instructions that cause the processor to compute the receive beamforming weight vector by computing a norm of the weighted channel signature vector and to divide the weighted channel signature vector by the norm.

24. The processor readable medium of claim 20, wherein the instructions that cause the processor to compute comprise instructions that cause the processor to compute elements of the covariance matrix at each of a plurality of subcarriers comprising pilot subcarriers and data subcarriers containing data signals associated with one or more of the received transmissions, wherein the communication device has no a priori knowledge of the data signals contained in the received transmissions.

25. The processor readable medium of claim 20, and further comprising instructions that cause the processor to apply the beamforming weight vector to signals associated with a received transmission at the plurality of antennas.

26. The method of claim 1, wherein combining comprises combining column vectors of the covariance matrix according to the following equation:

$$\hat{H}=R(:,1)\ldots+\ldots e^{j\Theta m}R(:,m)$$

where $\hat{H}$ is the weighted channel signature vector, R is the covariance matrix, R(:,1)–R(:, m) are column vectors of the covariance matrix, and $$e^{j\Theta m}=\{R(:,m)\}^H * R(:,1)/abs(\{R(:,m)\}^H * R(:,1)) \text{ for } 2 \leq m \leq M,$$

and where H is the Hermitian transpose operation and M is a number of antennas of the first device.

27. The method of claim 1, wherein combining comprises combining row vectors of the covariance matrix according to the following equation:

$$\tilde{H}=\{R(1,:)...+...e^{j\Theta m}R(m,:)\}^H$$

where $\tilde{H}$ is the weighted channel signature vector, R is the covariance matrix, R(1,:)–R(m,:) are row vectors of the covariance matrix, and $$e^{j\Theta m}=R(1,:)*\{R(m,:)\}^H / abs(R(1,:)*\{R(m,:)\}^H) \text{ for } 2 \leq m \leq M,$$

and where H is the Hermitian transpose operation and M is a number of antennas at the first device.

* * * * *